United States Patent
Sasai et al.

(10) Patent No.: US 7,583,899 B2
(45) Date of Patent: Sep. 1, 2009

(54) SPACE OPTICAL TRANSMISSION APPARATUS AND SPACE OPTICAL TRANSMISSION SYSTEM

(75) Inventors: Hiroyuki Sasai, Osaka (JP); Tomoaki Ieda, Osaka (JP); Kazutoshi Hase, Osaka (JP)

(73) Assignee: Panasonic Corporation, Osaka (JP)

( * ) Notice: Subject to any disclaimer, the term of this patent is extended or adjusted under 35 U.S.C. 154(b) by 610 days.

(21) Appl. No.: 11/498,144

(22) Filed: Aug. 3, 2006

(65) Prior Publication Data
US 2007/0031149 A1 Feb. 8, 2007

(30) Foreign Application Priority Data
Aug. 5, 2005 (JP) ............................. 2005-228157

(51) Int. Cl.
*H04B 10/10* (2006.01)
(52) U.S. Cl. ...................................... 398/131; 398/123
(58) Field of Classification Search ............... 398/91, 398/96, 122–123, 129, 131
See application file for complete search history.

(56) References Cited

U.S. PATENT DOCUMENTS 7,106,973 B2* 9/2006 Kube et al. ................. 398/164
2008/0008472 A1* 1/2008 Dress et al. ................... 398/66

FOREIGN PATENT DOCUMENTS

JP 2003-309524 10/2003

* cited by examiner

*Primary Examiner*—Leslie Pascal
(74) *Attorney, Agent, or Firm*—Wenderoth, Lind & Ponack, L.L.P.

(57) ABSTRACT

A space optical transmission apparatus is provided which achieves high-speed simultaneous space optical transmission with respect to a plurality of terminals. In the space optical transmission apparatus, a light receiving section receives an optical signal from a terminal. A control section estimates how much optical axes of a master station and the terminal are deviated from each other, based on the received optical signal. The control section selects one of a plurality of light sources which requires a smallest amount of shift of an optical axis thereof, based on the estimated optical axis deviation amount, so as to communicate with the terminal.

19 Claims, 9 Drawing Sheets

SPACE OPTICAL TRANSMISSION APPARATUS AND SPACE OPTICAL TRANSMISSION SYSTEM

BACKGROUND OF THE INVENTION

1. Field of the Invention

The present invention relates to a space optical transmission apparatus and a space optical transmission system for transmitting an optical signal via free space. More particularly, the present invention relates to a space optical transmission apparatus and a space optical transmission system for achieving simultaneous communication with a plurality of terminals.

2. Description of the Background Art

Figure 8:
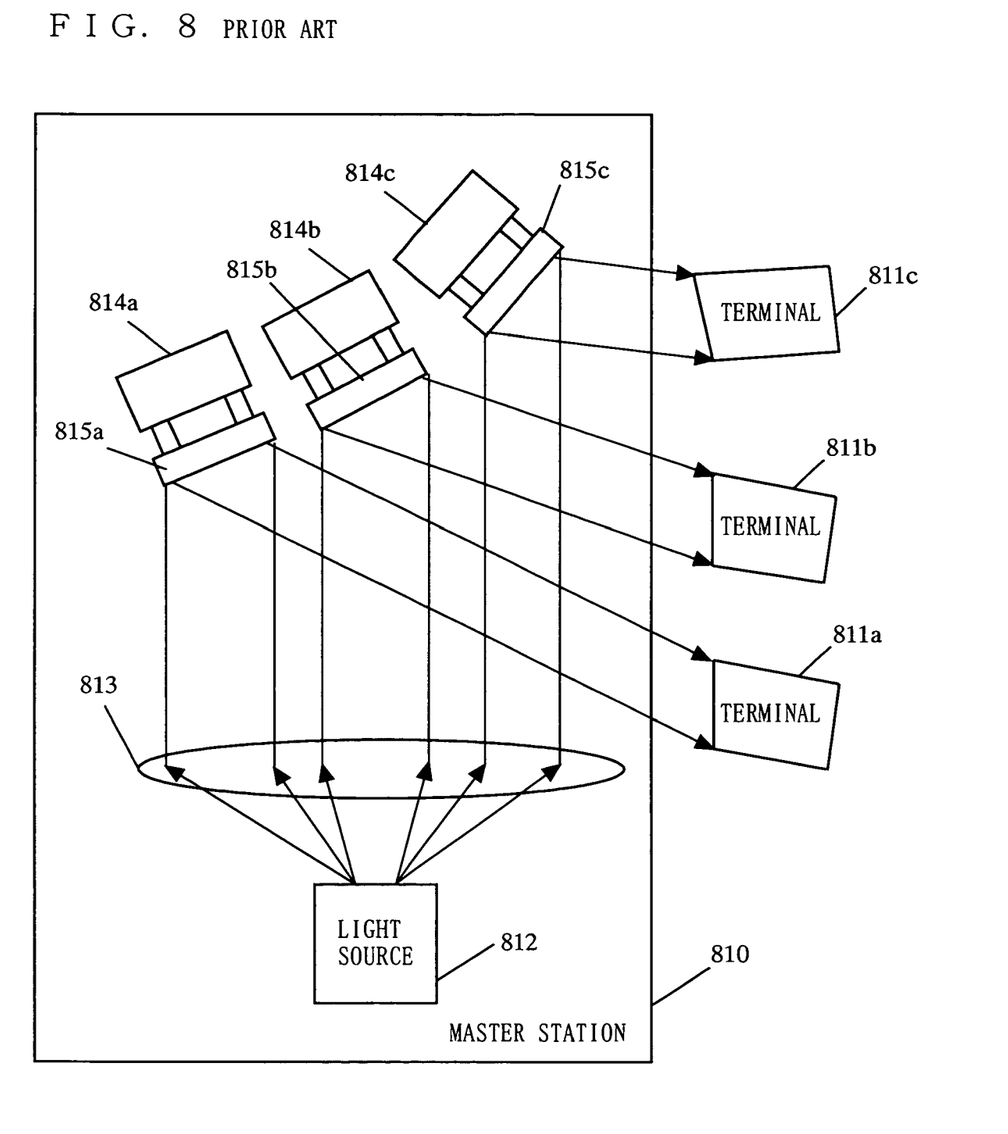
FIG. 8 is a diagram illustrating a conventional space optical transmission system.

In the field of free-space optical transmission, for example, Japanese Patent Laid-Open Publication No. 2003-309524 (hereinafter referred to as Patent Document 1) discloses a conventional space optical transmission system which achieves communication between a master station and a plurality of terminals. In the conventional space optical transmission system disclosed in Patent Document 1, an optical signal output from a light source provided in the master station is reflected and divided into a plurality of light beams, and angles of the reflected light beams are adjusted so that the light beams are directed toward the respective terminals. FIG. 8 is a diagram illustrating the conventional space optical transmission system disclosed in Patent Document 1.

In FIG. 8, the conventional space optical transmission system is composed of a master station 810 and a plurality of terminals 811a, 811b and 811c. In the master station 810, a light source 812 outputs an optical signal which is modulated using a signal to be transmitted. The optical signal output from the light source 812 is converted into a bundle of light beams substantially parallel to each other by an optical system 813, such as a lens or the like. In the master station 810, mirrors 815a, 815b and 815c for reflecting a portion of the bundle of light beams are provided within the light bundle. Also in the master station 810, angle adjusting mechanisms 814a, 814b and 814c are provided so as to adjust angles of the mirrors 815a, 815b and 815c. For example, the angle of the mirror 814a is adjusted so that a portion reflected by the mirror 81a of the light bundle is emitted toward the terminal 811a.

Figure 9:
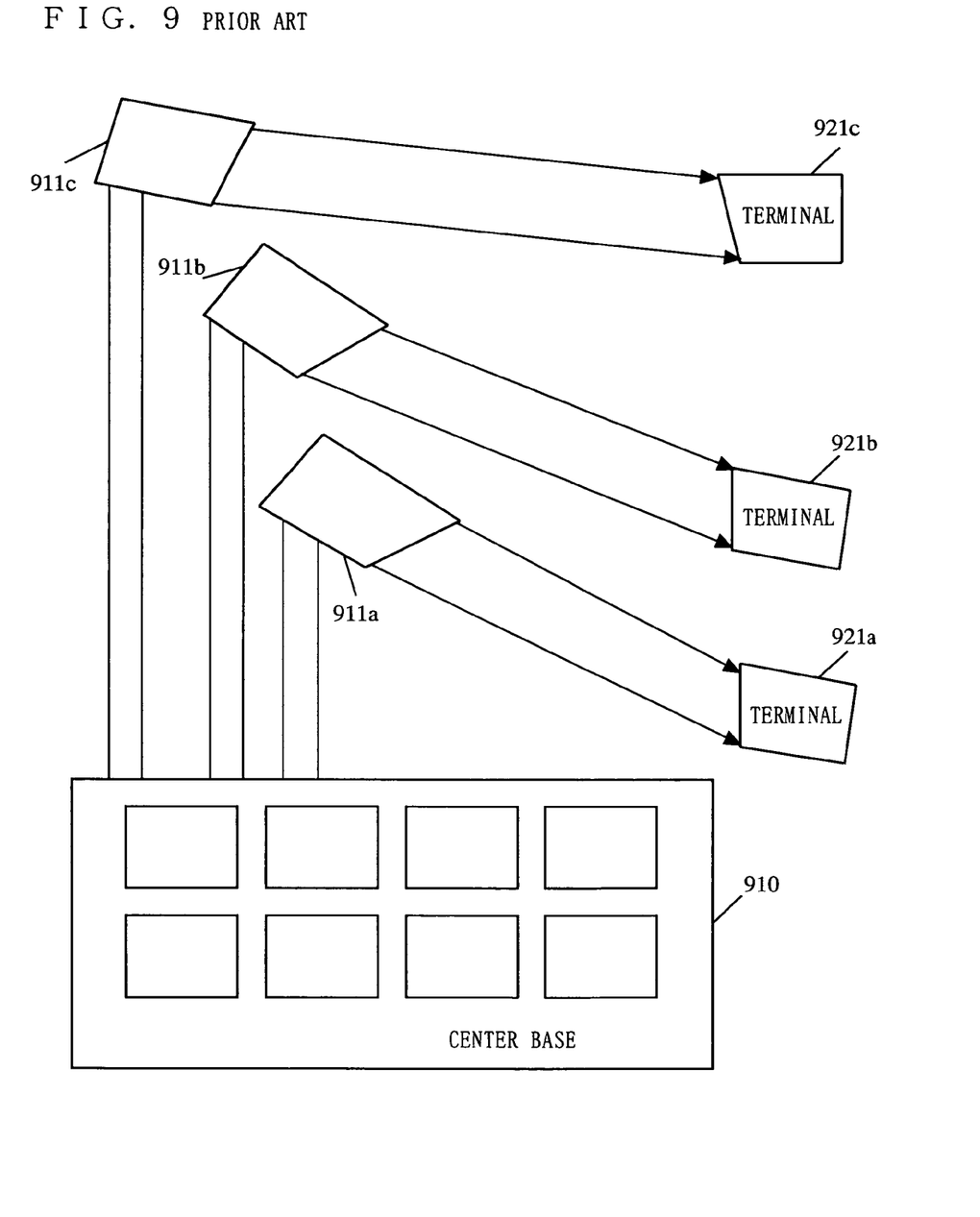
FIG. 9 is a diagram illustrating a conventional space optical transmission system.

Patent Document 1 also discloses a space optical transmission system which employs a plurality of sets of a pair of a space optical transmission apparatus and a terminal. FIG. 9 is a diagram illustrating the conventional space optical transmission system disclosed in Patent Document 1. In the conventional space optical transmission system of FIG. 9, space optical transmission apparatuses 911a, 911b and 911c are provided at a center base 910, respectively corresponding to terminals 921a, 921b and 921c provided in the vicinity of the center base 910. Thus, in the conventional space optical transmission system, by associating the space optical transmission apparatuses 911a, 911b and 911c with the terminals 921a, 921b and 921c, the viewing angle of transmitted light is reduced, so that levels of optical signals received by the terminals 921a, 921b and 921c are prevented from being decreased.

However, in the conventional space optical transmission system of FIG. 8, since an optical signal output from the single light source 812 is reflected and divided, a high-power light source is required, however, there is an upper limit of the power of the optical signal output from the light source 812 for the purposes of a reduction in power consumption and securing of safety of eyes. Therefore, in the conventional space optical transmission system, there is a limitation on the power of optical signals transmitted to the terminals 811a, 811b and 811c, so that high-speed space optical transmission cannot be performed with respect to the terminals 811a, 811b and 811c.

In addition, in the conventional space optical transmission system of FIG. 9, a large number of space optical transmission apparatuses 911a, 911b and 911c need to be provided in the vicinity of the center base 910, so that the whole system tends to be complicated, and it is difficult to secure a place for providing the space optical transmission apparatuses 911a, 911b and 911c.

SUMMARY OF THE INVENTION

Therefore, an object of the present invention is to provide a space optical transmission apparatus and a space optical transmission system which achieve high-speed simultaneous space optical transmission with respect to a plurality of terminals while avoiding a complicated configuration of the whole apparatus and system.

The present invention is directed to a space optical transmission apparatus for performing space optical transmission with respect to an optical signal using at least one terminal. To achieve the above-described object, the apparatus comprises a plurality of light sources for outputting optical signals modulated using a data signal to be transmitted, a plurality of lenses for converting the optical signals output from the plurality of light sources into optical signals having an appropriate viewing angle, a direction control section for controlling directions of the optical signals output from the plurality of lenses, at least one reception section for receiving an upward signal or signals output by the at least one terminal, and a control section for controlling the plurality of light sources and the direction control section based on location information of the at least one terminal. The control section specifies the location information of the at least one terminal from the received upward signal or signals from the at least one terminal, and based on the specified location information of the at least one terminal, drives only a required one or ones of the plurality of light sources, and controls the direction control section so that an optical axis or axes of the optical signal or signals are directed toward the at least one terminal.

Preferably, the control section selects one or ones of the plurality of light sources which has smallest amount of shift of an optical axis thereof, based on the specified location information of the at least one terminal, and drives only the selected light source or sources.

Preferably, the optical signals output by the plurality of light sources cover a spatial area including at least areas varying among the light sources. Thereby, the space optical transmission apparatus can perform simultaneous space optical transmission with respect to a plurality of terminals, and communication in a wider area.

When the upward signal or signals output by the at least one terminal are an optical signal, the at least one reception section is at least one light receiving section for receiving the optical signal or signals output by the at least one terminal, and the control section detects a direction or directions of the at least one terminal based on the optical signal or signals received by the at least one light receiving section, and specifies the location information of the at least one terminal from the detected direction or directions of the at least one terminal.

When the upward signal or signals output by the at least one terminal are an optical signal, a viewing angle of the optical signal output via the direction control section is narrower than a viewing angle or angles of the optical signal or signals output by the at least one terminal. Thereby, the space optical transmission apparatus can obtain the location information of a terminal in a wider area, and a power of received light required for space optical transmission can be easily secured.

The upward signal or signals output by the at least one terminal may be a wireless signal. In this case, the at least one reception section receives the wireless signal or signals output by the at least one terminal. The control section detects a direction or directions of the at least one terminal based on the wireless signal received by the at least one reception section, and obtains the location information of the at least one terminal from the detected direction or directions of the at least one terminal. Also in this case, the space optical transmission apparatus can specify the location information of a terminal.

Preferably, wherein the at least one reception section receives an upward signal or signals including a relationship between relative locations of the space optical transmission apparatus and the at least one terminal, from the at least one terminal. The control section specifies the location information of the terminal from the relationship between relative locations of the space optical transmission apparatus and the at least one terminal, the relative relationship being included in the upward signal or signals received from the at least one terminal. Thereby, the space optical transmission apparatus can easily specify the location information of a terminal.

The at least one terminal may comprise a plurality of light receiving sections for converting an optical signal output from the space optical transmission apparatus into an electrical signal, a location information specifying section for specifying a relationship between relative locations of the space optical transmission apparatus and the terminal from the electrical signals output from the plurality of light receiving sections, and outputting location information of the terminal, and a transmission section for transmitting the location information output from the location information specifying section. In this case, the reception section receives the location information from the transmission section. The control section specifies the location information of the terminal based on the location information from the reception section.

Preferably, the space optical transmission apparatus further comprises a plurality of code generating sections for generating specific code sequences corresponding to the plurality of light sources, and a plurality of modulation sections for modulating the optical signals output by the light sources using the respective corresponding specific code sequences. The at least one reception section receives an upward signal including information about the light source corresponding to the specific code sequence or sequences from the at least one terminal. The control section specifies a light source generating the optical signal or signals received by the at least one terminal based on the information about the light source included in the upward signal or signals received by the at least one terminal, thereby specifying the location information of the at least one terminal. Thereby, the space optical transmission apparatus can easily specify the location information of a terminal.

Preferably, the space optical transmission apparatus further comprises a data switch section for selecting one or ones outputting an optical signal from the plurality of light sources based on the location information of the at least one terminal specified by the control section, and outputting the data signal toward the selected light source or sources. The space optical transmission apparatus may further comprises a data distributing section for distributing the data signal to the plurality of light sources. Thereby, the space optical transmission apparatus can perform broadcast-type space optical transmission with respect to a plurality of terminals with low power consumption.

Preferably, the control section controls the direction control section so that the optical signals output by the plurality of light sources are emitted toward the at least one terminal which can perform space optical transmission. Thereby, the space optical transmission apparatus can easily specify the location information of a terminal.

Preferably, the space optical transmission apparatus may further comprise a data switch section for selecting one or ones outputting an optical signal from the plurality of light sources based on the location information of the at least one terminal, and outputting the data signal toward the selected light source or sources, and a variable-rate modulation section for changing a modulation scheme of the optical signal output by the light source, depending on a state of reception of the optical signal at the at least one terminal. Thereby, the space optical transmission apparatus can select an optimal modulation scheme, depending on a state of communication with a terminal.

The space optical transmission apparatus may further comprises a data distributing section for distributing the data signal to the plurality of light sources, and a variable-rate modulation section for changing a modulation scheme of the optical signal output by the light source, depending on a state of reception of the optical signal at the at least one terminal.

The control section may control the direction control section so that the optical signals output by the plurality of light sources are multiplexed and output to the at least one terminal. Thereby, the space optical transmission apparatus can easily secure a power of received light required for space optical transmission, thereby making it possible to achieve high-speed and high-quality space optical transmission.

Preferably, the upward signal received by the at least one terminal is a time division multiplexed signal. Alternatively, the upward signal or signals received by the at least one terminal may be a frequency division multiplexed signal. Alternatively, the upward signal or signals received by the at least one terminal may be a code division multiplexed signal.

Also, the present invention is directed to a space optical transmission system in which a space optical transmission apparatus and at least one terminal perform space optical transmission using an optical signal. To achieve the above-described object, the space optical transmission apparatus comprises a plurality of light sources for outputting optical signals modulated using a data signal to be transmitted, a plurality of lenses for converting the optical signals output from the plurality of light sources into optical signals having an appropriate viewing angle, a direction control section for controlling directions of the optical signals output from the plurality of lenses, at least one reception section for receiving an upward signal or signals output by the at least one terminal, and a control section for controlling the plurality of light sources and the direction control section based on location information of the at least one terminal. The control section specifies the location information of the at least one terminal from the received upward signal or signals from the at least one terminal, and based on the specified location information of the at least one terminal, drives only a required one or ones of the plurality of light sources, and controls the direction control section so that an optical axis or axes of the optical signal or signals are directed toward the at least one terminal. The terminal comprises a light receiving section for receiving the optical signal output by the space optical transmission apparatus, and a light source for outputting an optical signal toward the terminal.

As described above, according to the present invention, the space optical transmission apparatus selects one of a plurality of light sources based on the location information of a terminal to communicate therewith, thereby making it possible to achieve simultaneous space optical transmission with respect to a plurality of terminals. In addition, since the location information of a terminal to communicate therewith is specified, viewing angles of optical signals of a plurality of light sources can be narrowed. Thereby, a power of received light required for space optical transmission is easily secured, thereby making it possible to achieve high-speed and high-quality space optical transmission.

These and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

Figure 1:
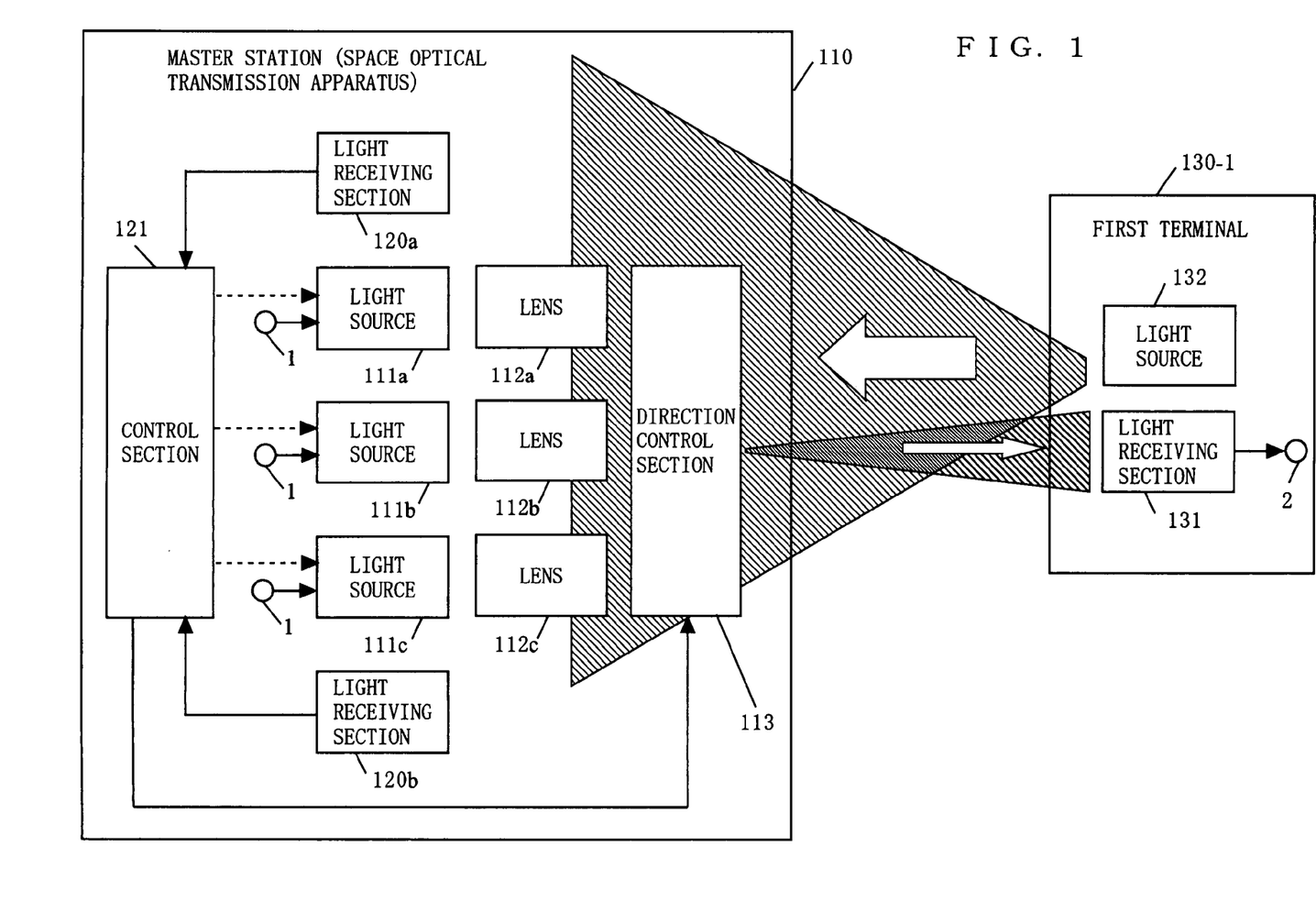
FIG. 1 is a block diagram illustrating an exemplary configuration of a space optical transmission system according to a first embodiment of the present invention.

FIG. 1 is a block diagram illustrating an exemplary configuration of a space optical transmission system according to a first embodiment of the present invention. In FIG. 1, the space optical transmission system of the present invention is composed of a space optical transmission apparatus 110 and a first terminal 130-1. Note that the space optical transmission apparatus is hereinafter referred to as a master station. Also, the first terminal 130-1 is simply referred to as a terminal 130-1. The master station 110 communicates with the terminal 130-1 by space optical transmission. The master station 110 comprises an input terminal 1, a plurality of light sources 111a, 111b and 111c, a plurality of lenses 112a, 112b and 112c, a direction control section 113, a plurality of light receiving sections 120a, 120b and 120c (the light receiving section 120c is not shown), and a control section 121. The terminal 130-1 comprises a light receiving section 131, a light source 132, and an output terminal 2.

An operation of the space optical transmission system of the first embodiment of the present invention will be described with reference to FIG. 1. In FIG. 1, when the terminal 130-1 wants to communicate with the master station 110, an upward optical signal having a wide viewing angle is transmitted from the light source 132 to the master station 110. Note that it is assumed that the terminal 130-1 knows an approximate location of the master station 110. The upward optical signal output from the light source 132 is received by the light receiving sections 120a, 120b and 120c of the master station 110. In the master station 110, the light receiving sections 120a, 120b and 120c each convert the received optical signal into an electrical signal, and input the electrical signal into the control section 121.

The control section 121 specifies a direction from which the upward optical signal comes from the terminal 130-1 (i.e., information about a location of the terminal 130-1), based on the three electrical signals input from the light receiving sections 120a, 120b and 120c. For example, the control section 121 selects two of the three electrical signals input from the light receiving sections 120a, 120b and 120c, and calculates a difference between the two selected electrical signals, thereby estimating how much optical axes of the master station 110 and the terminal 130-1 are deviated from each other. Based on the estimated optical axis deviation amount, the control section 121 selects one of the light sources 111a, 111b and 111c which requires a smallest amount of shift of an optical axis thereof. It is here assumed that the light source 111b is selected.

A data signal to be transmitted is input to the light source 111b via the input terminal 1. The light source 111b outputs an optical signal which is modulated using the input data signal. The optical signal output from the light source 111b is converted into an optical signal having an appropriate viewing angle by the lens 112b, is controlled by the direction control section 113 so that an optical axis thereof coincides with a direction of the terminal 130-1, and is output into space.

Thus, the space optical transmission system drives only the light source 111b required for space optical transmission, and does not drive the other light sources 111a and 111c, resulting in low power consumption. In addition, if the viewing angle of the upward optical signal transmitted toward the master station 110 by the terminal 130-1 is broader than the viewing angle of a downward optical signal, the probability that the master station 110 can receive the upward optical signal is increased, thereby making it possible to easily achieve space optical transmission even in a wide area.

Next, an operation of the space optical transmission system when a second terminal 130-2 enters a communication area while the terminal 130-1 is communicating with the master station 110, will be described with reference to FIG. 2.

Figure 2:
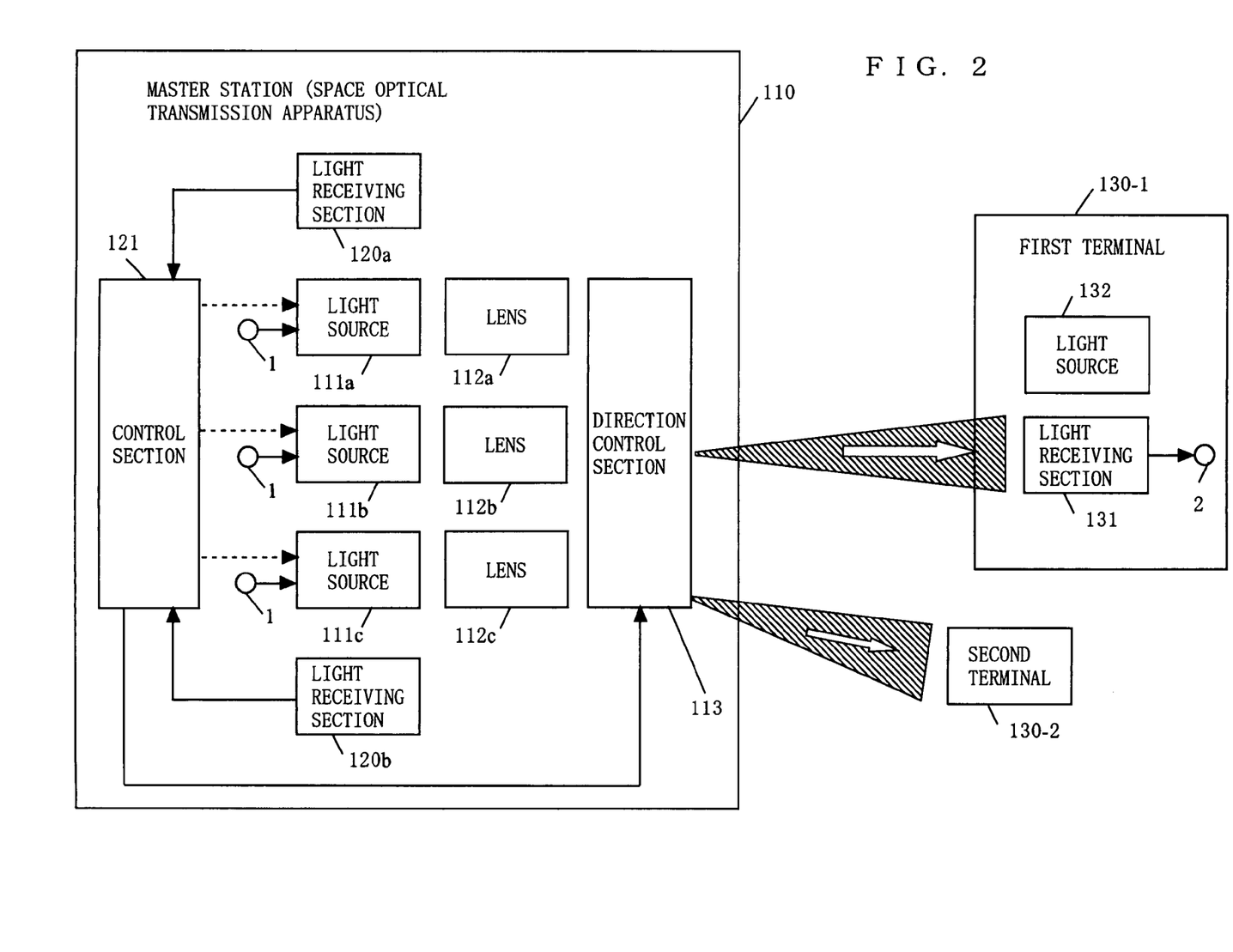
FIG. 2 is a block diagram illustrating an exemplary configuration of the space optical transmission system when the space optical transmission system simultaneously communicates with a plurality of terminals.

FIG. 2 is a block diagram illustrating an exemplary configuration of the space optical transmission system when the space optical transmission system simultaneously communicates with a plurality of terminals. The space optical transmission system of FIG. 2 has the same configuration as that of FIG. 1, except that only the second terminal 130-2 is added to the space optical transmission system of FIG. 1.

In FIG. 2, when the second terminal 130-2 wants to communicate with the master station 110, the second terminal 130-2 transmits an upward optical signal having a wide viewing angle from a light source 132 toward the master station 110, as is similar to the terminal 130-1. Note that the second terminal 130-2 is hereinafter simply referred to as a terminal 130-2. The master station 110 estimates a direction toward a location of the terminal 130-2 by receiving the upward optical signal of the terminal 130-2. This operation of the terminal 130-2 is transmission of the upward optical signal toward the master station 110, and therefore, does not have a bad influence on communication of other terminals. Thereafter, the master station 110 selects a light source (e.g., the light source 111c) for communicating with the terminal 130-2 in a manner similar to that when the light source 111b is selected, and performs space optical transmission with respect to the terminal 130-2.

As described above, in the space optical transmission system of the first embodiment of the present invention, the master station 110 selects a light source to be used from the light sources 111a, 111b and 111c based on information about the location of a terminal to be communicated with, thereby making it possible to achieve simultaneous space optical transmission with respect to a plurality of terminals. In addition, the information about the location of a terminal to be communicated with is specified, thereby making it possible to narrow the viewing angles of the optical signals output from the light sources 111a, 111b and 111c. Thereby, a power of received light required for space optical transmission is easily secured, thereby making it possible to achieve high-speed and high-quality space optical transmission.

Note that the number of the light receiving sections 120a, 120b and 120c is not limited to three, and may be four or more. Also, the number of the light sources 111a, 111b and 111c and the number of the lenses 112a, 112b and 112c are not limited to three, and may be any number.

In the above description, the upward signal from a terminal to the master station 110 is assumed to be an optical signal. Instead of the optical signal, a wireless signal may be used. In this case, in the space optical transmission system, a plurality of wireless antennas may be provided in the master station 110 and may be adaptive array antennas which estimate directions from which wireless signals transmitted from terminals come. Even if the wireless signal is used as the upward signal in the space optical transmission system, an effect similar to that when an optical signal is used can be obtained. When the light receiving sections 120a, 120b and 120c receive a signal other than optical signals from a terminal, the light receiving sections 120a, 120b and 120c are referred to as reception sections 120a, 120b and 120c.

Second Embodiment

Figure 3:
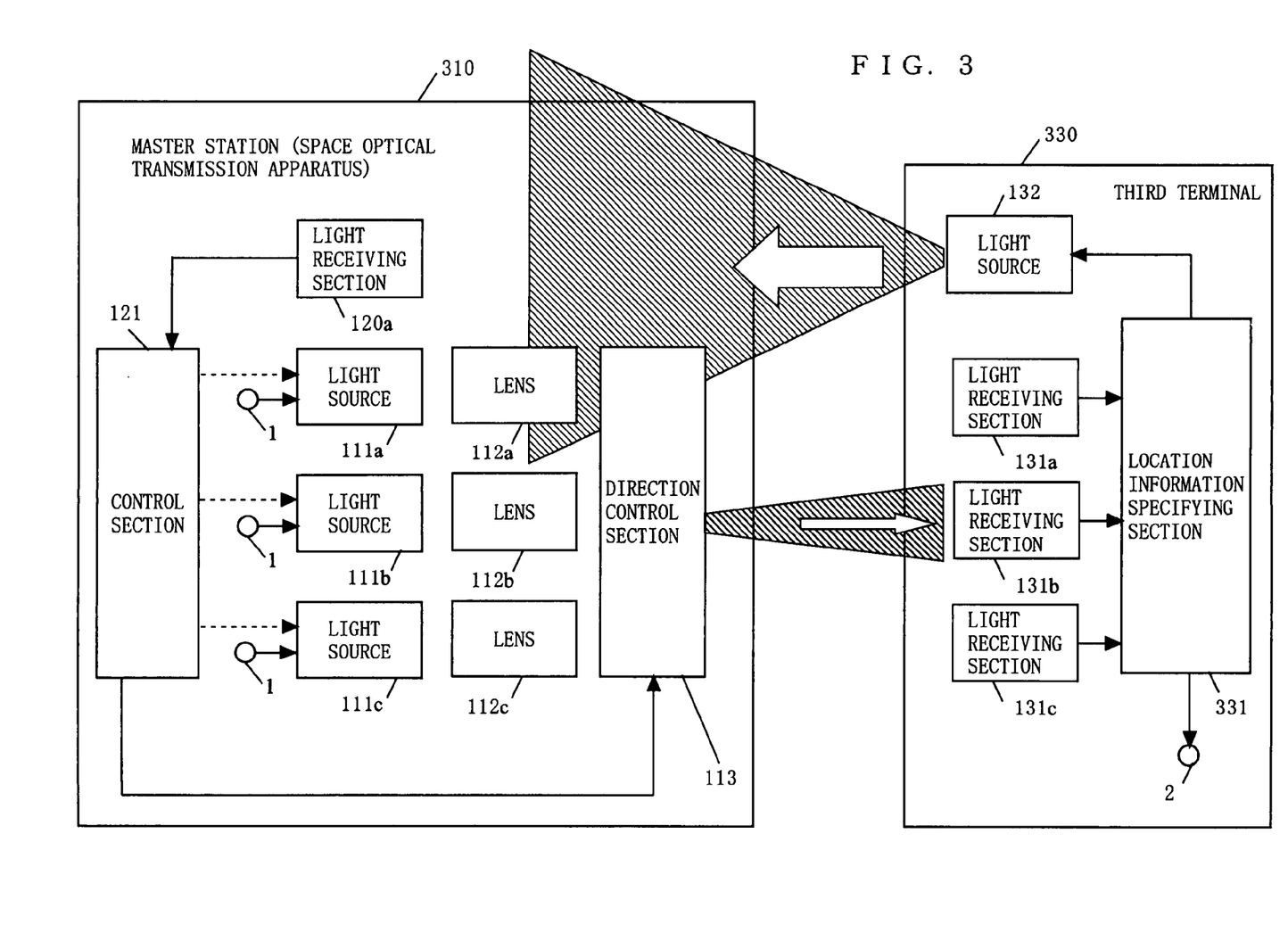
FIG. 3 is a block diagram illustrating an exemplary configuration of a space optical transmission system according to a second embodiment of the present invention.

FIG. 3 is a block diagram illustrating an exemplary configuration of a space optical transmission system according to a second embodiment of the present invention. In FIG. 3, a master station 310 has a configuration different from that of the master station 110 of FIG. 1 in that the light receiving sections 120b and 120c are removed. The other parts of the master station 310 are indicated with the same reference numerals as those of the master station 110 of FIG. 1 and will not be described. A third terminal 330 comprises a plurality of light receiving sections 131a, 131b and 131c, a light source 132, a location information specifying section 331, and an output terminal 2. Note that the third terminal 330 is hereinafter referred to as a terminal 330.

An operation of the space optical transmission system of the second embodiment of the present invention will be described with reference to FIG. 3. In FIG. 3, when the terminal 330 wants to communicate with the master station 310, an optical signal output from the master station 310 is received by the light receiving sections 131a, 131b and 131c. The light receiving sections 131a, 131b and 131c each convert the received optical signal into an electrical signal, and inputs the electrical signal into the location information specifying section 331. The location information specifying section 331 specifies a relationship between relative locations of the master station 310 and the terminal 330 (i.e., location information) from the input electrical signal. The light source 132 modulates an optical signal using the location information specified by the location information specifying section 331, and transmits the modulated optical signal toward the master station 310.

An upward optical signal transmitted from the terminal 330 is received by the light receiving section 120a of the master station 310. In the master station 310, the light receiving section 120a converts the received optical signal into an electrical signal, and inputs the electrical signal into the control section 121. The control section 121 detects the location information from the input electrical signal, and specifies a location of the terminal 330. The control section 121 selects one of the light sources 111a, 111b and 111c which requires a smallest amount of shift of an optical axis thereof. It is here assumed that the light source 111b is selected.

A data signal is input to the light source 111b via the input terminal 1. The light source 111b outputs an optical signal which is modulated using the input data signal. The optical signal output from the light source 111b is converted into an optical signal having an appropriate viewing angle by the lens 112b, is controlled by the direction control section 113 so that an optical axis thereof coincides with a direction of the terminal 330, and is output into space.

Also, in the space optical transmission system of the second embodiment, even when a plurality of terminals are present, it is possible to communicate with the terminals by performing an operation similar to that of the first embodiment.

As described above, in the space optical transmission system of the second embodiment of the present invention, a terminal specifies the relationship between the relative locations of the terminal and the master station 310. Therefore, the master station 310 can easily specify the location information of the terminal. Based on the location information of the terminal to be communicated with, the master station 310 selects one to be used of the light sources 111a, 111b and 111c, thereby making it possible to achieve simultaneous space optical transmission with respect to a plurality of terminals. Also, since the location information of a terminal to be communicated with is specified, the viewing angles of optical signals output from the light sources 111a, 111b and 111c can be narrowed. Thereby, a power of received light required for space optical transmission is easily secured, thereby making it possible to achieve high-speed and high-quality space optical transmission.

In the above description, the upward signal from the terminal 330 to the master station 310 is assumed to be an optical signal. Instead of the optical signal, a wireless or wired signal may be used. In this case, in the space optical transmission system, any configuration which can transmit information from a terminal to the master station 310 may be used, including, for example, a configuration in which a wireless antenna is provided in the master station 310 where a wireless signal is used, a configuration in which a cable is used, and the like.

Third Embodiment

Figure 4:
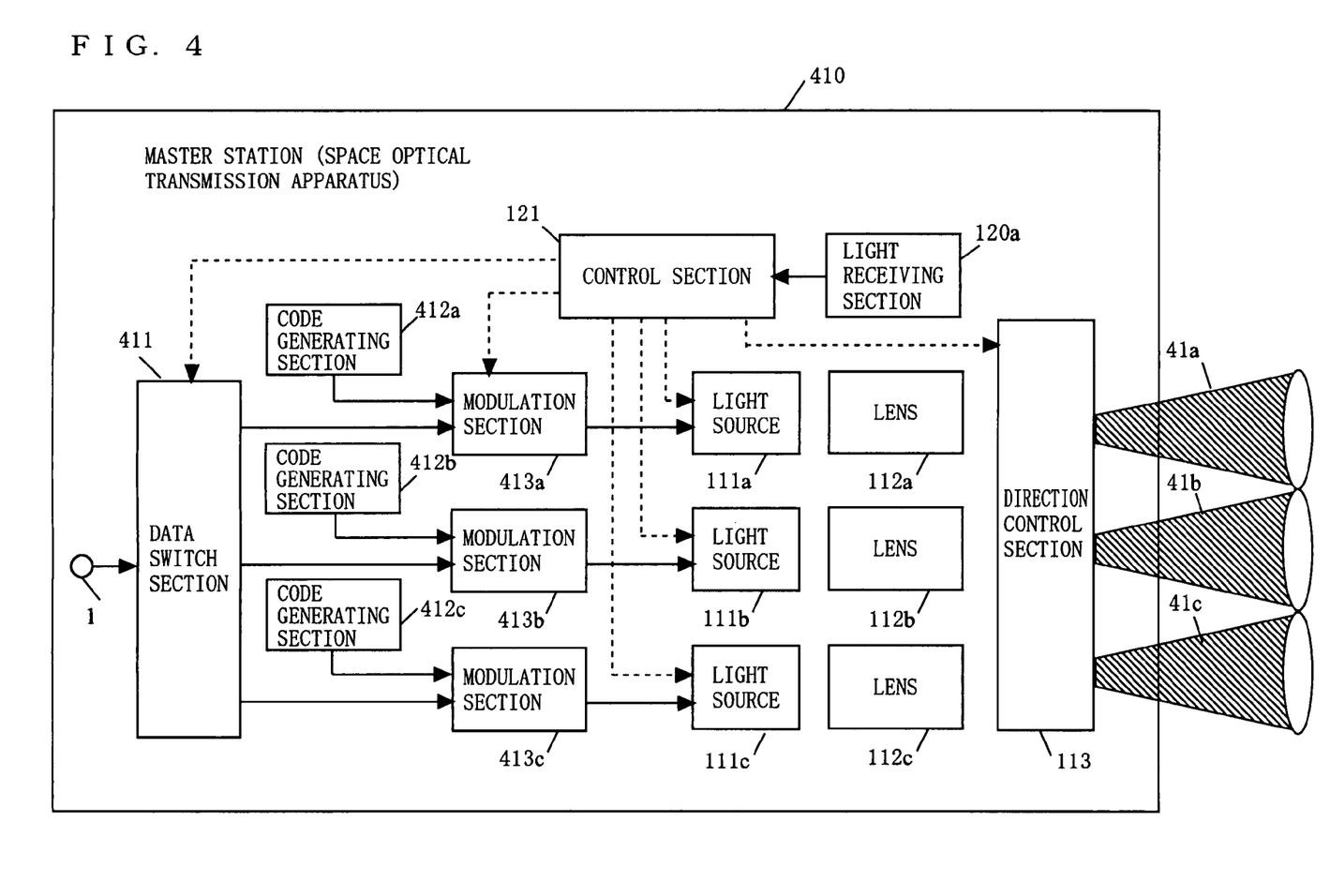
FIG. 4 is a block diagram illustrating an exemplary configuration of a master station 410 according to a third embodiment of the present invention.

FIG. 4 is a block diagram illustrating an exemplary configuration of a master station 410 according to a third embodiment of the present invention. The master station 410 of FIG. 4 is different from the master station 310 of FIG. 3 in that a data switch section 411, a plurality of code generating sections 412a, 412b and 412c, and a plurality of modulation sections 413a, 413b and 413c are further provided. The other parts of the master station 410 are indicated with the same reference numerals as those of the master station 310 of FIG. 3 and will not be described.

Figure 5:
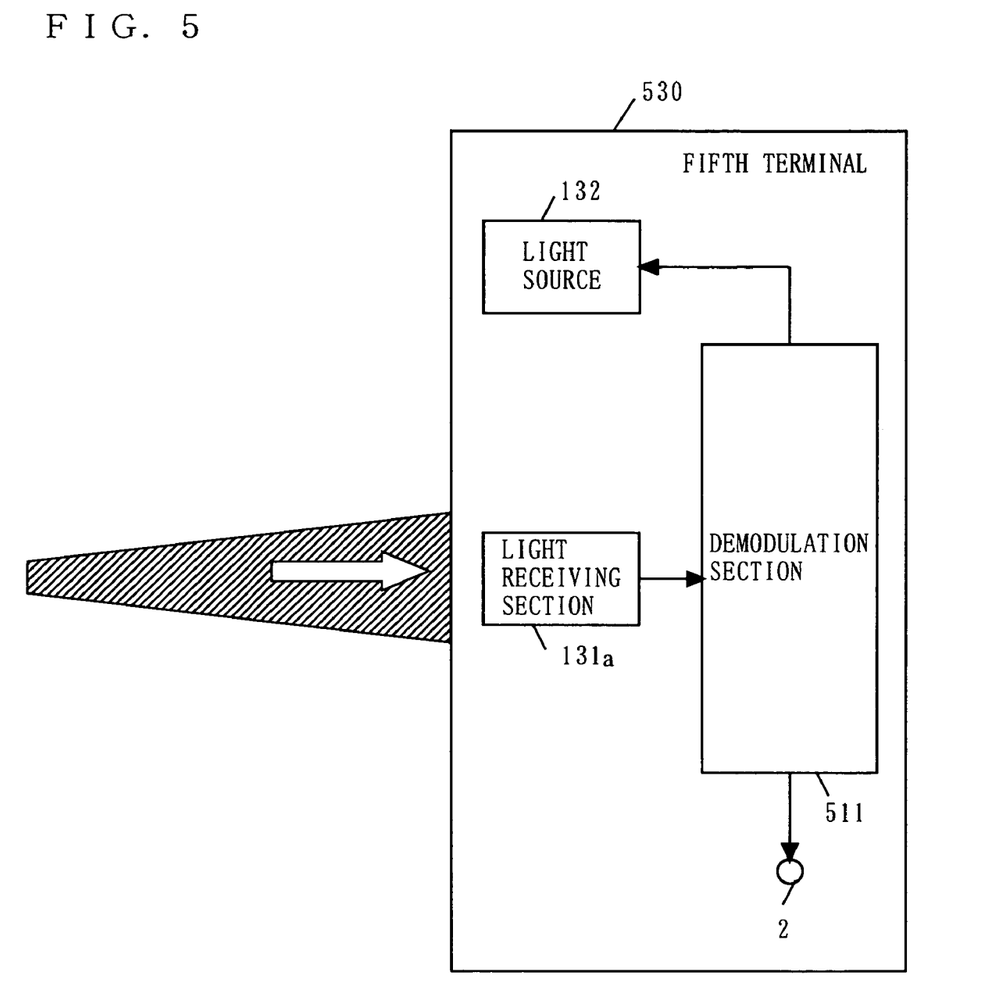
FIG. 5 is a block diagram illustrating an exemplary configuration of a terminal 530 according to a third embodiment of the present invention.

FIG. 5 is a block diagram illustrating an exemplary configuration of a terminal 530 according to a third embodiment of the present invention. In FIG. 5, the fourth terminal 530 is different from the terminal 130-1 of FIG. 1 in that a demodulation section 511 is further provided. The other parts of the fourth terminal 530 are indicated with the same reference numerals as those of the terminal 130-1 of FIG. 1 and will not be described. Note that the fourth terminal 530 is hereinafter simply referred to as a terminal 530.

An operation of the space optical transmission system of the third embodiment of the present invention will be described with reference to FIGS. 4 and 5. In the space optical transmission system of the third embodiment, as in the second embodiment, the terminal 530 is a main part which specifies a relative relationship (i.e., location information) between locations of the master station 410 and the terminal 530.

In FIG. 4, the master station 410 comprises the code generating sections 412a, 412b and 412c corresponding to the light sources 111a, 111b and 111c so as to make it easier for the terminal 530 to specify the location information. The code generating sections 412a, 412b and 412c generate specific code sequences corresponding to the light sources 111a, 111b and 111c, respectively. The code sequences are input to the modulation sections 413a, 413b and 413c. The modulation sections 413a, 413b and 413c modulate optical signals output from the light sources 111a, 111b and 111c, using the input code sequences.

Specifically, the code sequences output from the code generating sections 412a, 412b and 412c are converted into optical signals by the light sources 111a, 111b and 111c via the modulation sections 413a, 413b and 413c. In the master station 410, when the location information is specified, all of the light sources 111a, 111b and 111c output optical signals 41a, 41b and 41c. Note that the master station 410 may transmit the code sequences either repeatedly or intermittently.

In FIG. 5, in the terminal 530, a light receiving section 131a converts a received optical signal into an electrical signal, and inputs the electrical signal into the demodulation section 511. The demodulation section 511 demodulates a code sequence included in the input electrical signal to specify one of the light sources 111a, 111b and 111c of the master station 410 which outputs the optical signal. It is here assumed that the light source 111a is specified. The light source 132 modulates an optical signal using information about the light source 111a specified by the demodulation section 511, and transmits the modulated optical signal toward the master station 410.

The upward optical signal output by the terminal 530 is received by the light receiving section 120a of the master station 410. In the master station 410, the light receiving section 120a converts the received optical signal into an electrical signal, and inputs the electrical signal into the control section 121. The control section 121 detects information of a light source included in the input electrical signal, and based on the detected light source information, specifies one of the light sources 111a, 111b and 111c which outputs the optical signal. It is here assumed that the light source 111a is specified. Thereby, the control section 121 can know that the optical signal output by the light source 111a has been received by the terminal 530, and can specify the location information of the terminal 530.

Note that the terminal 530 may modulate an optical signal using a code sequence demodulated by the demodulation section 511, and may return the demodulated code sequence to the master station 410. Also in this case, the master station 410 can specify the location information of the terminal 530. Specifically, in the master station 410, the control section 121 detects a code sequence included in an input electrical signal, and based on the detected code sequence, specifies one of the light sources 111a, 111b and 111c which outputs the optical signal. Thereby, the control section 121 can know that the optical signal output by the light source 111a has been received by the terminal 530, and can specify the location information of the terminal 530.

Next, a method with which the master station 410 transmits a data signal to the terminal 530, will be described. In the master station 410, a data signal is input via the input terminal 1 to the data switch section 411. The data switch section 411 selects a terminal to which the data signal should be transmitted, depending on a content of the data signal, and outputs the data signal to an appropriate channel. It is here assumed that the terminal 530 is selected as the terminal to which the data signal should be transmitted, and a channel which employs the light source 111a is selected as the appropriate channel.

The data signal output from the data switch section 411 is input to the modulation section 413a. Therefore, the code sequence output from the code generating section 412a and the data signal output from the data switch section 411 are input to the modulation section 413a. When the location information of a terminal corresponding to the light source 111a has been specified in the control section 121, the modulation section 413a selects the data signal. On the other hand, when the location information of a terminal corresponding to the light source 111a has not been specified in the control section 121 (i.e., a terminal corresponding to the light source 111a has not been detected), the code sequence is selected. The signal selected by the modulation section 413a is emitted into space via the light source 111a, a lens 112a, and the direction control section 113.

As described above, in the space optical transmission system of the third embodiment of the present invention, the master station 410 assigns specific code sequences to the respective light sources 111a, 111b and 111c, and emits an optical signal including a code sequence into space. A terminal which receives the optical signal specifies a light source which has output the optical signal, from the code sequence, and outputs information about the specified light source toward the master station 410. Thereby, the master station 410 can easily specify the location information of the terminal.

Note that, in the space optical transmission system of this embodiment, a data distributing section which distributes a data signal to each channel may be provided instead of the data switch section 411 of FIG. 4, thereby making it possible to perform broadcast-type space optical transmission which communicates the same data over a wide area.

In the above description, the upward signal from the terminal 530 to the master station 410 is assumed to be an optical signal. Instead of the optical signal, a wireless or wired signal may be used. In this case, in the space optical transmission system, any configuration which can transmit information from a terminal to the master station 410 may be used, including, for example, a configuration in which a wireless antenna is provided in the master station 410 where a wireless signal is used, a configuration in which a cable is used, and the like.

Fourth Embodiment

Figure 6:
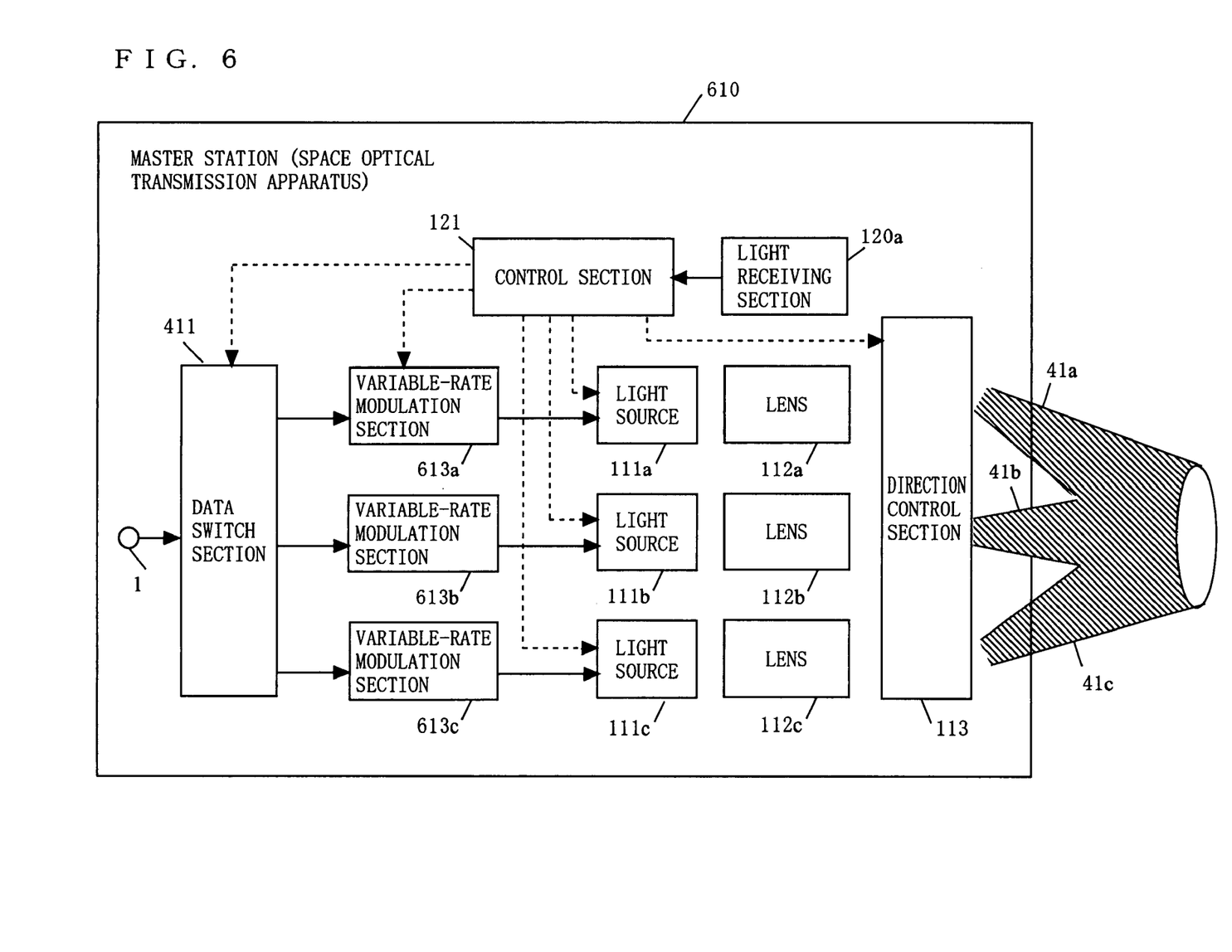
FIG. 6 is a block diagram illustrating an exemplary configuration of a space optical transmission system according to a fourth embodiment of the present invention.

FIG. 6 is a block diagram illustrating an exemplary configuration of a master station 610 according to a fourth embodiment of the present invention. The master station 610 of FIG. 6 is different from the master station 310 of FIG. 3 in that a data switch section 411 and a plurality of variable-rate modulation sections 613a, 613b and 613c are further provided. The other parts of the master station 610 are indicated with the same reference numerals as those of the master station 310 of FIG. 3 and will not be described.

In the space optical transmission system of the fourth embodiment, the master station 610 is characterized by multiplexing and transmitting an optical signal toward a terminal (not shown). The master station 610 specifies the location information of the terminal using any method described in the first to third embodiments. In the master station 610, the control section 121 determines whether or not an optical signal is to be multiplexed before transmission to the terminal, depending on the location information of the terminal, the data type, the type of a service to be provided, or the like. It is here assumed that the control section 121 determines that the optical signals 41a, 41b and 41c are to be multiplexed before transmission to the terminal.

The control section 121 controls the data switch section 411 to output a data signal to the variable-rate modulation sections 613a, 613b and 613c. Also, the control section 121 determines a rate at which the data signal is modulated, depending on the location information of a terminal, a data type, the type of a service to be provided, or the like. The control section 121 can change the determined rate, depending on a state of communication with a terminal, or the like. The variable-rate modulation sections 613a, 613b and 613c change the modulation rates of optical signals output by the light sources 111a, 111b and 111c into the modulation rate determined by the control section 121. Alternatively, the variable-rate modulation sections 613a, 613b and 613c may modulate the data signal output by the data switch section 411 at the rate determined by the control section 121.

Note that the control section 121 may determine a modulation scheme of a data signal instead of determining the modulation rate of a data signal. In this case, the variable-rate modulation sections 613a, 613b and 613c change the modulation schemes of optical signals output by the light sources 111a, 111b and 111c into the modulation scheme determined by the control section 121. Alternatively, the variable-rate modulation sections 613a, 613b and 613c may modulate the data signal output by the data switch section 411 using the modulation scheme determined by the control section 121.

The control section 121 controls the light sources 111a, 111b and 111c and the direction control section 113 to multiplex a plurality of optical signals before transmission to terminals. A plurality of data signals output from the variable-rate modulation sections 613a, 613b and 613c are converted into a plurality of optical signals by the light sources 111a, 111b and 111c. The optical signals output by the light sources 111a, 111b and 111c are multiplexed and emitted into space by the direction control section 113 via the lenses 112a, 112b and 112c.

As described above, according to the space optical transmission system of the fourth embodiment of the present invention, the master station 610 can multiplex and transmit a plurality of optical signals to terminals. Thereby, a power of received light required for space optical transmission is easily secured, thereby making it possible to achieve high-speed and high-quality space optical transmission.

Figure 7:
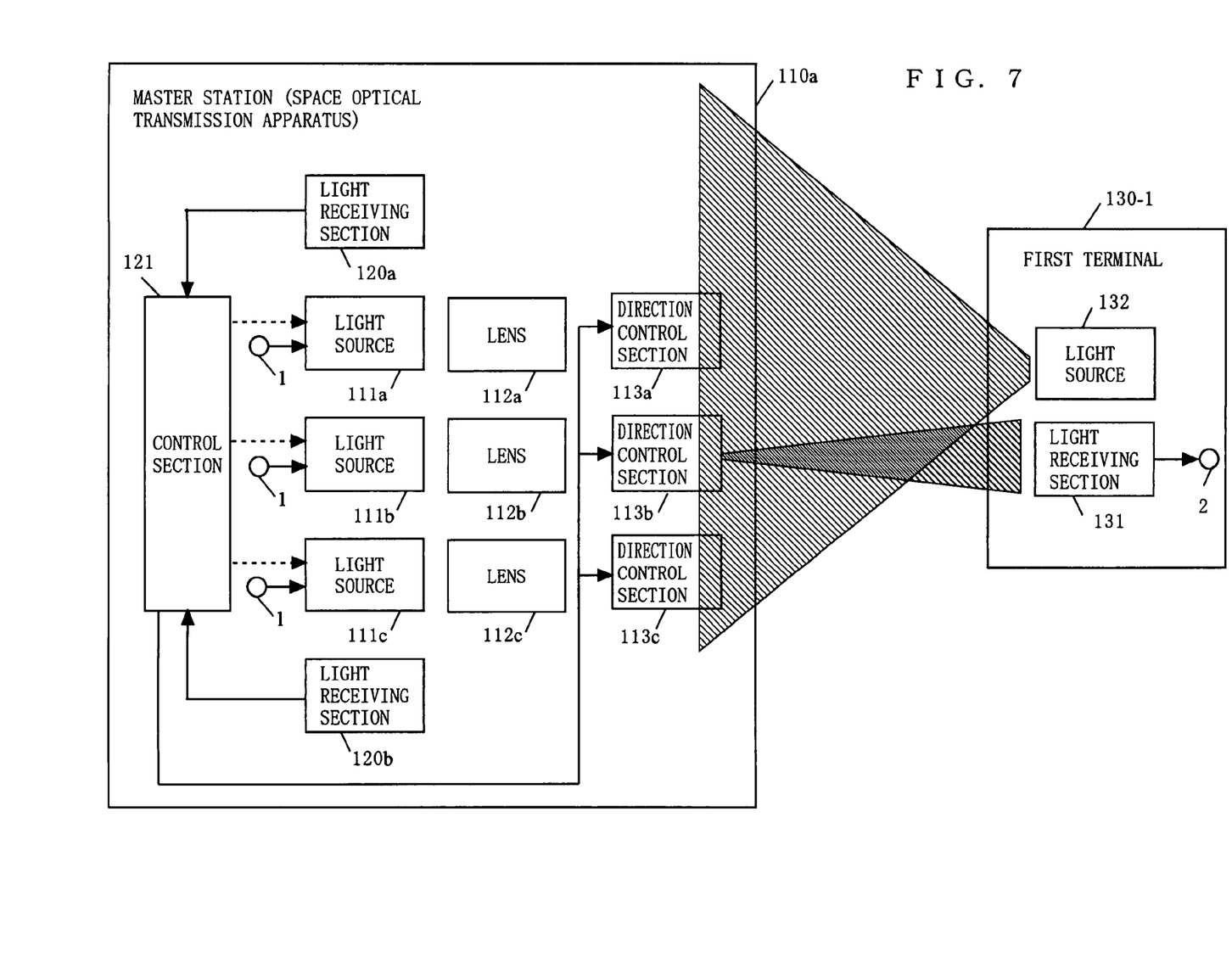
FIG. 7 is a block diagram illustrating an exemplary configuration of a space optical transmission system in which a master station 110a comprises a plurality of direction control sections.

Note that, in the space optical transmission systems according to the first to fourth embodiments of the present invention, the master station can also be composed of a plurality of direction control sections. FIG. 7 is a block diagram illustrating an exemplary configuration of a space optical transmission system in which a master station 110a comprises a plurality of direction control sections. Also in the master station 110a of FIG. 7, the direction of an optical signal is controlled by any of a plurality of direction control sections 113a, 113b and 113c, and the resultant optical signal is emitted into space.

The first to fourth embodiments of the present invention have been described, assuming that transmission from a plurality of terminals to a master station is performed using time division multiplexing. Alternatively, any other multiplexing transmission technique may be used, including frequency division multiplexing, code division multiplexing, and the like.

The features of the space optical transmission systems according to the first to fourth embodiments of the present invention may be used in combination. For example, the master station 110 of the first embodiment (see FIG. 1) and the terminal 330 of the second embodiment (see FIG. 3) can be used in combination.

The space optical transmission system of the present invention can be applied to, for example, a system in which simultaneous space optical transmission is achieved between a master station and a plurality of terminals.

While the invention has been described in detail, the foregoing description is in all aspects illustrative and not restrictive. It is understood that numerous other modifications and variations can be devised without departing from the scope of the invention.

What is claimed is:

1. A space optical transmission apparatus for performing space optical transmission with respect to an optical signal using at least one terminal, comprising:

a plurality of light sources for outputting optical signals modulated using a data signal to be transmitted;

a plurality of lenses for converting the optical signals output from the plurality of light sources into optical signals having an appropriate viewing angle;

a direction control section for controlling directions of the optical signals output from the plurality of lenses;

at least one reception section for receiving an upward signal or signals output by the at least one terminal; and a control section for controlling the plurality of light sources and the direction control section based on location information of the at least one terminal, wherein the control section specifies the location information of the at least one terminal from the received upward signal or signals from the at least one terminal, and based on the specified location information of the at least one terminal, drives only a required one or ones of the plurality of light sources, and controls the direction control section so that an optical axis or axes of the optical signal or signals are directed toward the at least one terminal.

2. The space optical transmission apparatus according to claim 1, wherein the control section selects one or ones of the plurality of light sources which has smallest amount of shift of an optical axis thereof, based on the specified location information of the at least one terminal, and drives only the selected light source or sources.

3. The space optical transmission apparatus according to claim 1, wherein the optical signals output by the plurality of light sources cover a spatial area including at least areas varying among the light sources.

4. The space optical transmission apparatus according to claim 1, wherein the upward signal or signals output by the at least one terminal are an optical signal,
the at least one reception section is at least one light receiving section for receiving the optical signal or signals output by the at least one terminal, and
the control section detects a direction or directions of the at least one terminal based on the optical signal or signals received by the at least one light receiving section, and specifies the location information of the at least one terminal from the detected direction or directions of the at least one terminal.

5. The space optical transmission system according to claim 1, wherein the upward signal or signals output by the at least one terminal are an optical signal, and
a viewing angle of the optical signal output via the direction control section is narrower than a viewing angle or angles of the optical signal or signals output by the at least one terminal.

6. The space optical transmission apparatus according to claim 1, wherein the upward signal or signals output by the at least one terminal are a wireless signal,
the at least one reception section receives the wireless signal or signals output by the at least one terminal, and
the control section detects a direction or directions of the at least one terminal based on the wireless signal received by the at least one reception section, and obtains the location information of the at least one terminal from the detected direction or directions of the at least one terminal.

7. The space optical transmission apparatus according to claim 1, wherein the at least one reception section receives an upward signal or signals including a relationship between relative locations of the space optical transmission apparatus and the at least one terminal, from the at least one terminal, and
the control section specifies the location information of the terminal from the relationship between relative locations of the space optical transmission apparatus and the at least one terminal, the relative relationship being included in the upward signal or signals received from the at least one terminal.

8. The space optical transmission apparatus according to claim 1, wherein the at least one terminal comprises:
a plurality of light receiving sections for converting an optical signal output from the space optical transmission apparatus into an electrical signal;
a location information specifying section for specifying a relationship between relative locations of the space optical transmission apparatus and the terminal from the electrical signals output from the plurality of light receiving sections, and outputting location information of the terminal; and
a transmission section for transmitting the location information output from the location information specifying section,
wherein the reception section receives the location information from the transmission section, and
the control section specifies the location information of the terminal based on the location information from the reception section.

9. The space optical transmission apparatus according to claim 1, further comprising:

a plurality of code generating sections for generating specific code sequences corresponding to the plurality of light sources; and
a plurality of modulation sections for modulating the optical signals output by the light sources using the respective corresponding specific code sequences,
wherein the at least one reception section receives an upward signal including information about the light source corresponding to the specific code sequence or sequences from the at least one terminal, and
the control section specifies a light source generating the optical signal or signals received by the at least one terminal based on the information about the light source included in the upward signal or signals received by the at least one terminal, thereby specifying the location information of the at least one terminal.

10. The space optical transmission apparatus according to claim 9, further comprising:
a data switch section for selecting one or ones outputting an optical signal from the plurality of light sources based on the location information of the at least one terminal specified by the control section, and outputting the data signal toward the selected light source or sources.

11. The space optical transmission apparatus according to claim 9, further comprising:
a data distributing section for distributing the data signal to the plurality of light sources.

12. The space optical transmission apparatus according to claim 9, wherein the control section controls the direction control section so that the optical signals output by the plurality of light sources are emitted toward the at least one terminal which can perform space optical transmission.

13. The space optical transmission apparatus according to claim 1, further comprising:
a data switch section for selecting one or ones outputting an optical signal from the plurality of light sources based on the location information of the at least one terminal, and outputting the data signal toward the selected light source or sources; and
a variable-rate modulation section for changing a modulation scheme of the optical signal output by the light source, depending on a state of reception of the optical signal at the at least one terminal.

14. The space optical transmission apparatus according to claim 1, further comprising:
a data distributing section for distributing the data signal to the plurality of light sources; and
a variable-rate modulation section for changing a modulation scheme of the optical signal output by the light source, depending on a state of reception of the optical signal at the at least one terminal.

15. The space optical transmission apparatus according to claim 1, wherein the control section controls the direction control section so that the optical signals output by the plurality of light sources are multiplexed and output to the at least one terminal.

16. The space optical transmission apparatus according to claim 1, wherein the upward signal received by the at least one terminal is a time division multiplexed signal.

17. The space optical transmission apparatus according to claim 1, wherein the upward signal or signals received by the at least one terminal are a frequency division multiplexed signal.

18. The space optical transmission apparatus according to claim 1, wherein the upward signal or signals received by the at least one terminal are a code division multiplexed signal.

19. A space optical transmission system in which a space optical transmission apparatus and at least one terminal perform space optical transmission using an optical signal, wherein
the space optical transmission apparatus comprises:
- a plurality of light sources for outputting optical signals modulated using a data signal to be transmitted;
- a plurality of lenses for converting the optical signals output from the plurality of light sources into optical signals having an appropriate viewing angle;
- a direction control section for controlling directions of the optical signals output from the plurality of lenses;
- at least one reception section for receiving an upward signal or signals output by the at least one terminal; and
- a control section for controlling the plurality of light sources and the direction control section based on location information of the at least one terminal,
   wherein the control section specifies the location information of the at least one terminal from the received upward signal or signals from the at least one terminal, and based on the specified location information of the at least one terminal, drives only a required one or ones of the plurality of light sources, and controls the direction control section so that an optical axis or axes of the optical signal or signals are directed toward the at least one terminal, and the terminal comprises:
- a light receiving section for receiving the optical signal output by the space optical transmission apparatus; and
- a light source for outputting an optical signal toward the terminal.

* * * * *